US008830249B2

(12) United States Patent
Osman

(10) Patent No.: US 8,830,249 B2
(45) Date of Patent: Sep. 9, 2014

(54) ACCELERATED TEXTURE LOOKUPS USING TEXTURE COORDINATE DERIVATIVES

(75) Inventor: Steven Osman, San Francisco, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/554,976

(22) Filed: Jul. 20, 2012

(65) Prior Publication Data

US 2013/0187920 A1   Jul. 25, 2013

Related U.S. Application Data

(60) Provisional application No. 61/527,061, filed on Sep. 12, 2011.

(51) Int. Cl.
G09G 5/00 (2006.01)
G06T 15/04 (2011.01)
G06T 15/00 (2011.01)
G06F 12/02 (2006.01)

(52) U.S. Cl.
CPC ........... G06T 15/04 (2013.01); G06T 15/005 (2013.01); *G06F 2212/455* (2013.01); *G06F 12/0207* (2013.01); G06F 12/0215 (2013.01)
USPC ......................................................... 345/582

(58) Field of Classification Search
USPC .......................................................... 345/582
See application file for complete search history.

(56) References Cited

U.S. PATENT DOCUMENTS

| 6,433,789 B1* | 8/2002 | Rosman .................. 345/582 |
| 2004/0227765 A1 | 11/2004 | Emberling |
| 2005/0275658 A1* | 12/2005 | Sasaki et al. ............ 345/557 |
| 2008/0024510 A1 | 1/2008 | Lee et al. |
| 2009/0315908 A1* | 12/2009 | Comparan et al. ........ 345/582 |

OTHER PUBLICATIONS

Ballantine, J. P. "Difference Quotients." The American Mathematical Monthly 26.2 (1919): 53-59.*
International Search Report and Written Opinion for corresponding International Application No. PCT/US2012/054662, mailed Jan. 3, 2013, 9 pages.

* cited by examiner

*Primary Examiner* — Ulka Chauhan
*Assistant Examiner* — Schiller Hill
(74) *Attorney, Agent, or Firm* — Kilpatrick Townsend & Stockton LLP

(57) ABSTRACT

Methods, systems, and devices are disclosed for preparing to prefetch memory in 3D graphical shader programs. Based on the memory addresses of texels from a texture map that were previously read, a memory address of a to-be-read texel is estimated by using a first-order derivative of the memory address with respect to pixel distance. The estimated memory address is then prefetched for use when the pixel corresponding to the texel is rendered. Whether or not to perform the estimation of the texel memory address can be determined by whether the corresponding pixels are on the same, flat facet on a 3D model. Multiple directions on the facet can be used for memory address estimation as well as higher-order derivatives.

18 Claims, 7 Drawing Sheets

ACCELERATED TEXTURE LOOKUPS USING TEXTURE COORDINATE DERIVATIVES

CROSS-REFERENCES TO RELATED APPLICATIONS

This application claims the benefit of U.S. Provisional Application No. 61/527,061, filed Sep. 12, 2011, which is hereby incorporated by reference it its entirety for all purposes.

BACKGROUND

1. Field of the Invention

Embodiments of the present invention relate to computer graphics processing systems in general and, in particular, to graphics processing units that predict memory fetches for texture maps for rendering three-dimensional objects.

2. Description of the Related Art

Three-dimensional (3D or 3-D) models in modern video games and computer aided design (CAD) applications use texture maps to approach a realistic appearance. Texture maps, sometimes called textures, are typically a table of color, transparency, material properties, surface orientations, or other features that can be digitally wrapped around or otherwise mapped to a 3D object. Despite the name, they not only can define the textural appearance of an object but also its color, reflective properties, material properties, and other surface detail. In video games, the textures used for a 3D model often include a diffuse color texture, a specular (shiny) color texture, a normal map, a transparency map, and material index, among others.

In computer graphics rendering, some of the highest latency operations in a graphics processing unit (GPU) are related to memory accesses. Memory read operations can take orders of magnitude longer to conduct than algebraic operations, such as adding, subtracting, multiplying, and dividing. For example, it is not uncommon for reading a value from memory to take 10-100 times the clock cycles than it takes to add two values together.

In the prior art, shaders, which despite the name are general rendering programs and not limited to shading effects, compensate for memory access latency by starting several rendering threads at once in a row. Each thread is assigned a pixel to render. The thread uses the assigned pixel to look up what object (or background) the pixel corresponds to and accesses the appropriate texture maps for texturing. Particularly, the memory locations of appropriate texels within the texture maps are read for the pixel. When a thread is finished with a pixel, another thread is called for another pixel. This goes on and on until all the pixels of the image are rendered. The number of threads are called at one time are limited by the number of registers or stack memory for tracking the threads and associated variables.

Although graphics processors and rendering techniques have improved by leaps and bounds in the past few decades, notably in mass produced, consumer-grade video game hardware, there is an ever-present need in the art for faster and more efficient 3D rendering.

BRIEF SUMMARY

Methods, systems, and devices are disclosed for prefetching memory associated with texture maps for shader programs. In general, memory locations of previously-accessed texels are used to estimate a memory location that will be accessed in the future. For example, a first-order derivative, akin to a finite difference and difference quotient, is computed for memory addresses with respect to pixel locations in the same triangular facet of a 3D model. The derivative is used to estimate a memory location for another texel that will probably be accessed for another pixel. The estimated memory location is then read so that its contents are placed into local variables or a local cache. If the shader program subsequently renders a pixel corresponding to the texel that was prefetched, then rendering can go faster because the texel's memory has already been read.

A first-order derivative can be used to accurately estimate a future memory address if the memory addresses for the texture map are continuous and the pixels are part of the same planar facet on a three-dimensional model. If it is determined that the pixels used to create the derivative and a future pixel is on the same facet, then the derivative can be computed and the memory read. If they are on different facets that are skewed with respect to each other, then computation of the derivative can be avoided because the estimation may likely be inaccurate given the skew and discontinuity between the facets. Furthermore, the estimate may be inaccurate because memory for different facets may be non-contiguous.

Some embodiments of the present disclosure relate to a method of preparing to prefetch a texel for graphics processing. The method includes receiving memory addresses for texels of a texture map, the texels corresponding to pixels in an image, determining that the pixels all correspond to a common facet of a three-dimensional model, computing, using at least one processor operatively coupled with a memory, a derivative by dividing a difference in the memory addresses by a distance between the pixels in the image, and using the computed derivative to prefetch information for another pixel location. Computing the derivative for prefetching is based on a determination that the pixels correspond to the same facet.

Some embodiments relate to a method for preparing to prefetch a texel for graphics processing. The method includes receiving a first memory address of a first texel of a texture map to be sampled for application to a three-dimensional model, the first texel corresponding to a first pixel in an image, receiving a second memory address of a second texel of the texture map, the second texel corresponding to a second pixel in the image, computing, using at least one processor operatively coupled with a memory, a derivative by dividing a difference between the first and second memory addresses by a distance between locations of the first and second pixels of the image, and estimating a third memory address of a third texel of the texture map based on the computed derivative.

Other embodiments relate to machine-readable tangible storage media and computer systems that employ or store instructions for the methods described above.

A further understanding of the nature and the advantages of the embodiments disclosed and suggested herein may be realized by reference to the remaining portions of the specification and the attached drawings.

DETAILED DESCRIPTION

Figure 1:
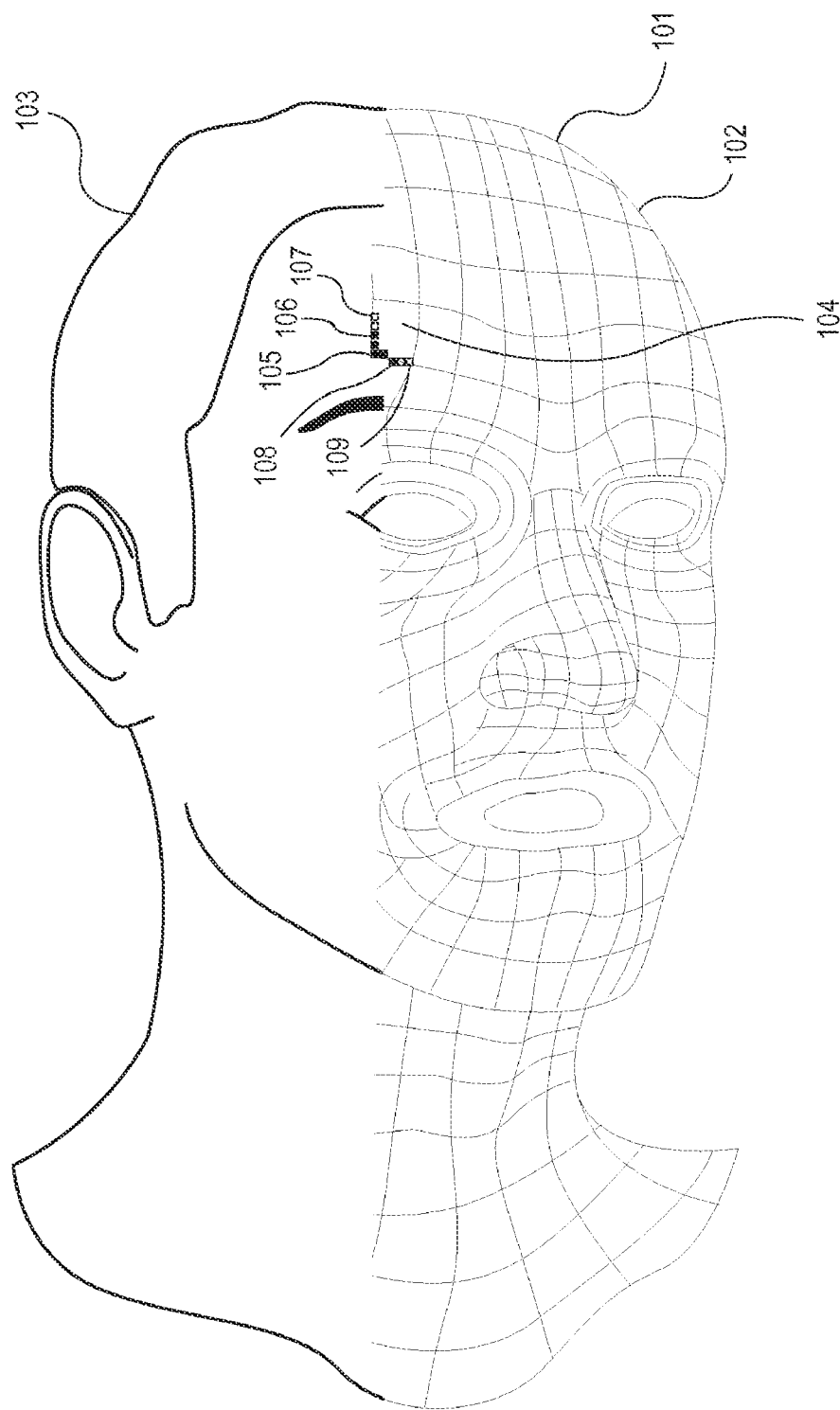
FIG. 1 illustrates a 3D model being textured in accordance with an embodiment.

In general, methods, systems, and devices are disclosed for estimating memory addresses to be read when applying texture maps to two-, three-, or other dimensional objects in scenes. A derivative is taken for memory addresses of texels in a texture map with respect to pixel locations, and the derivative is used to estimate a memory address that will be called in the future. Other extrapolation techniques can also be used. Contents of the estimated memory address are read into a local cache so as to minimize latency when it is time for the corresponding pixel to be rendered.

A determination of whether the pixels correspond to the same portion, such as a facet, of a 3D model can be used to decide whether the estimate is worth pursuing. For example, if the pixels are on different facets (e.g., flat triangles) of the 3D model, then the estimate may be well off the true value and not worth calculating.

Higher-order derivatives can be calculated for facets on different faces. This may be especially useful when a faceted 3D model is attempting to approximate a curved surface, such as a head. That is, when the many facets of a 3D model are an approximation to a curve, then a higher-order polynomial fit that introduces curves may be a better fit. In this case, a determination that pixels are on the next face over can initiate a higher-order derivative calculation and to estimated the proper memory location.

Derivatives can be taken in perpendicular (i.e., orthogonal) directions. For example, a derivative can be calculated for an x-direction on a quadrilateral facet and then another derivative calculated for the y-direction. The directions can align with facet directions, screen space, texture space, or other convenient directions for calculation.

A "derivative" includes a difference quotient of a finite difference as well as other derivatives. For example, a difference in memory locations divided by a difference in pixel locations can be a derivative. Expressed mathematically, the example derivative can be cast as:

$$\text{deriv}\_x = (\text{mem}_1 - \text{mem}_0)/(\text{sqrt}(\text{pixel}_{x1,y0}^2 - \text{pixel}_{x0,y0}^2))$$   Eqn. 1:

whereas deriv_x is the derivative, $\text{mem}_0$ and $\text{mem}_1$ are memory locations of texels, and $\text{pixel}_{x0,y0}$ and $\text{pixel}_{x1,y0}$ are screen locations of pixels. The function sqrt( ) returns a positive square root. The texel of $\text{mem}_0$ maps or otherwise corresponds to $\text{pixel}_{x0,y0}$, and the texel of $\text{mem}_1$ maps or otherwise corresponds to $\text{pixel}_{x1,y0}$.

The derivative can be used to estimate and then prefetch a memory location to be used in the future. For example, a third memory location can be estimated by the equation:

$$\text{mem}_2 = \text{mem}_0 + \text{deriv}\_x * \text{sqrt}(\text{pixel}_{x2,y0}^2 - \text{pixel}_{x0,y0}^2)$$   Eqn. 2:

whereas $\text{mem}_2$ is the estimated third memory location and $\text{pixel}_{x2,y0}$ is a screen location of a pixel to which the texel of $\text{mem}_2$ probably corresponds.

In some existing graphics engines, a function called ddx( ) for computing derivatives is supported in hardware. The ddx( ) function typically operates on values within memory addresses and not the memory addresses themselves. The inventor recognizes that this pre-existing function can be used in some embodiments to quickly calculate the derivatives of memory addresses.

Other algorithms can estimate memory locations for non-linear surfaces. For example, hardware can interpolate bezier or b-spline curves. In this case it is not a linear relationship; however, it is still an interpolation/subdivision whose derivative is known to take. Therefore, one can look for patterns in memory accesses. In those cases, the surface derivative can be used (which is derived analytically by the curve parameters) in combination with the memory addresses (which are observed as the surface is being interpolated) to predict future memory accesses.

Often a shader operates on many pixels. As a rasterizer traverses a triangle facet of a 3D model and generates pixels, it can evaluate the direction it is traveling along the triangle. The rasterizer can determine how texture coordinates used to reference textures vary along the triangle. This information can be used to speculatively prefetch textures for additional pixels as they are being rasterized. This can be done in software in the shader itself where the shader issues fire-and-forget texture lookups based on the derivatives of texels it expects to use in the future. It can also be built into hardware to aid in prefetching at a low level.

In disparate point clouds, there are a series of 3D points. Each point is an x, y and z location. It is not part of a facet, so there is no travelling along a surface. However, an algorithm can look at the parameters for 2 independent points and use them to predict the behavior of a third point.

As shown above, one can accelerate loading memories for pixels 3, 4, 5 and more from a single facet. However, points 1 and 2 can also be accelerated. A "point cloud" approach can be taken, which chooses any two points in a data set to make a guess for where those first two points will be. The facet that was rendered before it can be considered, for example. The first and last points can be chosen from that facet, and the first and last memory addresses used by it.

Technical advantages of embodiments include faster rastering. By predicting future memory accesses based on patterns observed in current memory accesses, a GPU can preemptively fetch future memory accesses, thereby greatly reducing latency when the accesses are actually needed. Though this solution might result in the need for a larger cache, it can reduce the size of a GPU's register file because not as many threads need to be in flight. Generally speaking, embodiments can take advantage of the fact that shader computation is somewhat 'free' relative to the cost of memory access. It is recognized that a computation may be wasted by precomputing predictive memory accesses and then discarding the results, but that the waste may be offset by the benefit of shorter memory latencies when a substantial number of computations result in correct estimates.

FIG. 1 illustrates a 3D model being textured in accordance with an embodiment. Three-dimensional model 101 can be defined by vertices, individual voxels, or other means as known in the art. The figure shows quadrilateral elements on the model, but lines, triangular, hexagonal, and other elements are envisioned, as well as sprites and point sprites. "Sprites" include screen-aligned quadrilaterals in which only two opposing corners are specified, or as otherwise known in the art. "Point sprites" include quadrilaterals that are specified by a center and a width and height, or as otherwise known in the art. In the exemplary embodiment, model 101 is undergoing texturing from top to bottom. Textured portion 103 is on the top, and untextured portion 102 is on the bottom.

Pixels 105 and 106, which are relatively horizontally aligned in the figure, are undergoing processing in a shader program. During processing, memory locations of texels of a texture map that map to pixels 105 and 106 are determined through lookups. For example, it is determined that pixel 105 of the virtual camera has an unobstructed view of a visible fragment of 3D model 101 on facet 104. Therefore, the fragment of the 3D model must be lighted, colored, and otherwise textured using looked-up texture maps for viewing. The texture maps can be for color, normal maps, material, and other features.

Figure 2:
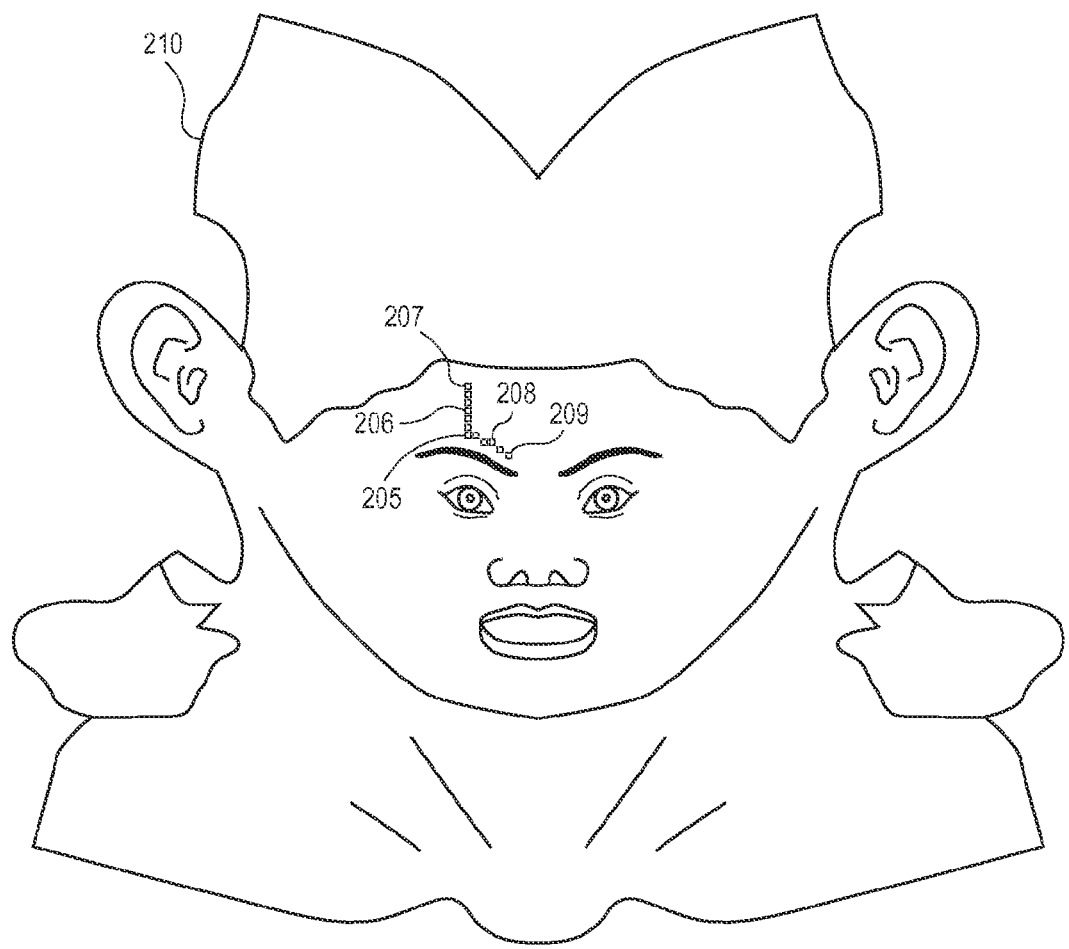
FIG. 2 illustrates a texture map used for texturing the 3D model of FIG. 1.

FIG. 2 illustrates a texture map used for texturing the 3D model of FIG. 1. Texture map 210 includes texels 205, 206, and 207, among others.

Texel 205 maps to pixel 105 of FIG. 1. More often than not, multiple texels map to a pixel, and so their colors, etc. are blended together. For purposes of this discussion, a single texel maps to a single pixel in this embodiment. Otherwise, it is understood that many texels may map to a pixel, and many pixels may be serviced by a texel.

Because texel 205 maps to pixel 105, the memory address of texel 205 can be said to correspond to pixel 105. Similarly, the memory address of texel 206 maps to pixel 106.

It is determined that pixels 105 and 106 correspond to portions of the same facet on the 3D model. That is, pixels 105 and 106 correspond to common facet 104. An estimate of memory may be accurate. Based on this finding of commonality, a derivative is calculated so that an estimate can be made.

A derivative can be calculated using a finite difference. For example, if the (32-bit) memory address of texel 205 is 8C81 and the memory address of texel 206 is 8C85, then the difference between the memory addresses is 8C85−8C81=0004. If the location of pixel 105 is (1152, 541), and the location of pixel 106 is (1175, 542), then a distance between the two pixels can be calculated as $sqrt((1175-1152)^2+(542-541)^2)=23.0217$ pixels. The derivative is 0004/23.0217.=0.1737.

Other distance measurements can also be used, such as a step-wise distance. For example, a distance for the above pixel locations can be calculated as simply (1175−1152)+(542+541)=23+1=24 pixels.

The derivative is then used to estimate a future memory location to be read. For example, a shader program may be configured to read ahead two pixels. That is, the shader program is configured to attempt to estimate the memory locations of the texture maps to be read for pixel 107 (FIG. 1) and then prefetch that memory. Other read-ahead configurations are possible. For example, a shader program may be configured to read ahead by 10, 100, or more pixels. The number of pixels to be read ahead may depend on the span of a facet. For example, a shader program may be configured to read ahead 50% of the way across a facet.

In the exemplary embodiment, it is determined that all the pixels are on the same, flat facet of the 3D model. That is, pixels 105 and 106, used to calculate the derivative, and pixel 107, which is to be estimated, are on common facet 104 of 3D model 101. Based on this determination, the logic proceeds to the estimation stage. That is, the shader attempts to estimate what memory location of the texture map will be read for pixel 107.

The memory address to be read for pixel 107 is estimated using the previously computed derivative. The base address of one of the texels from the derivative and the derivative itself are used to in a straight-line, slope-intercept, y=mx+b equation to extrapolate the memory address. To continue the numerical example from above, if the location of pixel 107 is (1190, 544), then the distance from pixel 105 to pixel 107 can be computed as $sqrt((1190-1152)^2+(544-541)^2)=38.1182$ pixels. The memory address is then estimated as 8C81+0.1737*38.1182=8C81+6.6=8C88.

Therefore, after having read memory addresses 8C81 and 8C85, the shader estimates that the next memory that will probably be read is 8C88. That memory address is determined without going through the usual channels of determining exactly where the next pixel is in relation to the model. The memory read operation can be started while the normal channels catch up with the estimation.

In the embodiment, the estimate is used to prefetch the memory. The shader program requests loading of memory address 8C88 into a local register. The shader can track that the memory was loaded, or it can merely load the memory address and let the hardware track the cached value from memory.

Other directions of pixels can be calculated to have their memory locations prefetched. For example, pixel 108 is in a relatively perpendicular direction from pixel 105 than pixel 106. Texel 208 is mapped to pixel 108. A derivative is calculated in this perpendicular direction. For example, a derivative can be calculated between the memory locations for texels 205 and 208 with respect to the locations of pixels 105 and 108. The derivative can be used to estimate the memory address of texel 209, which is mapped to pixel 109.

Estimations performed in different directions can be made faster in some embodiments when it is determined that all the pixels are on the same facet. For example, pixels 205-209 are all on facet 104. If the shader program determines that the first pixel is in the upper left, or other extremity, of a facet, then there may be no need to explicitly determine whether the other pixels are on the same facet. If the number of pixels to jump ahead are few and the facet is large, then it can be assumed that all the pixels are on the facet. This can speed rendering on relatively flat surfaces with few curves.

Figure 3:
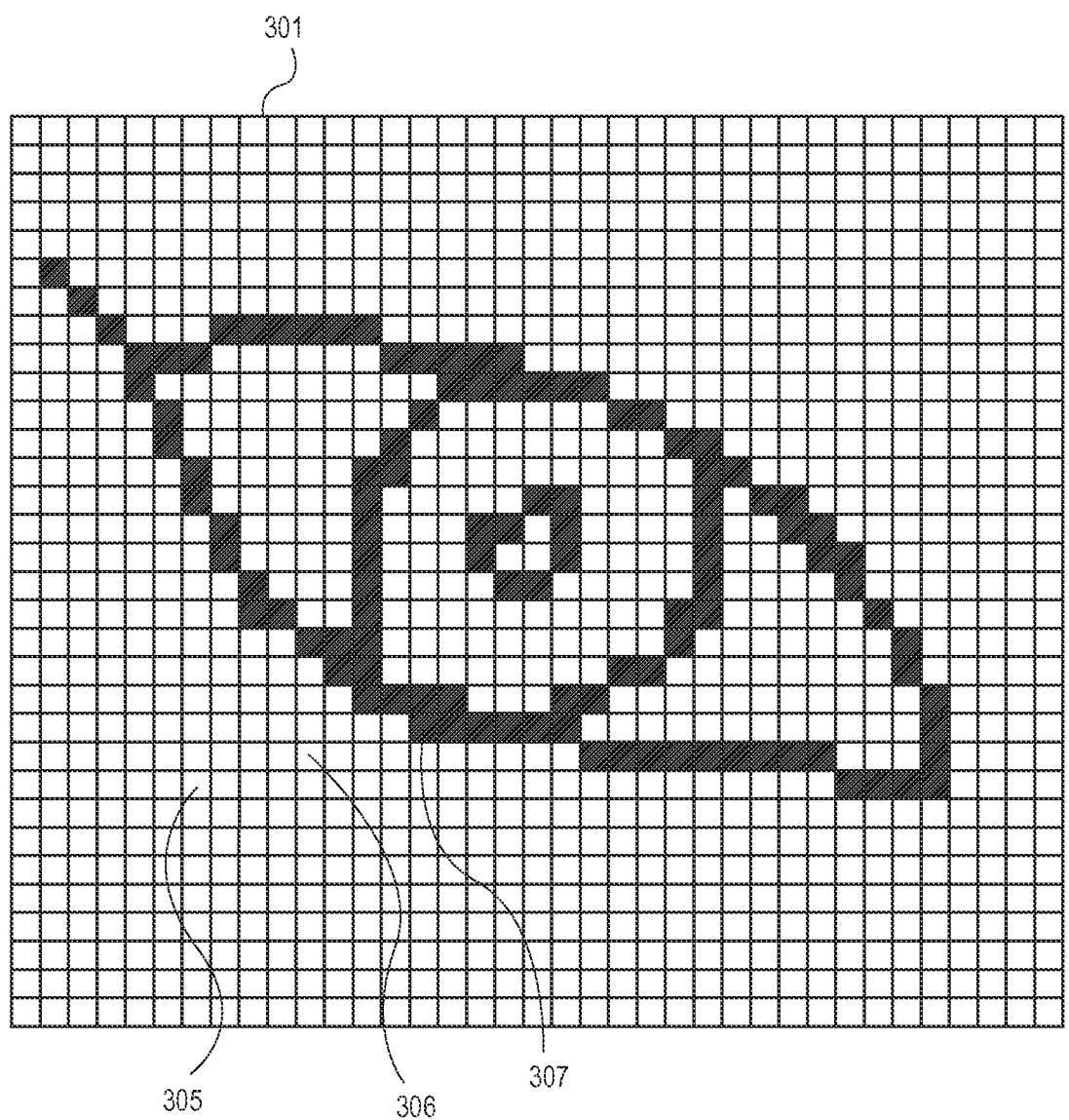
FIG. 3 illustrates a texel-level detail portion of a texture map in accordance with an embodiment.

FIG. 3 illustrates a texel-level detail portion of a texture map in accordance with an embodiment. For simplicity, no facets are shown in texel-level detail 301. Texel 306 is four texels over and one texel up from texel 305. The two texels have been read in sequence, and the hardware must estimate the next texel to be read. On this small scale, applying a straight-line visual technique that approximates the mathematical rigor of computing a derivative/slope and extrapolating a line, it is apparent that the memory address associated with texel 307 (four texels over and one texel up from texel 306) is probably the one that will be read next.

Even if the memory associated with texel 307 does not exactly correspond to the next pixel to be rendered, the memory will probably be accessed regardless because often a blend of texels are used for rendering. That is, even if the memory address associated with the texel just above 307 is the one that directly corresponds to the next pixel to be rendered, texel 307 will probably be blended in with that texel in order to render a final color. Because the memory from texel 307 has been read into the cache, that part of the blending algorithm may go faster than it otherwise would have gone.

Figure 4:
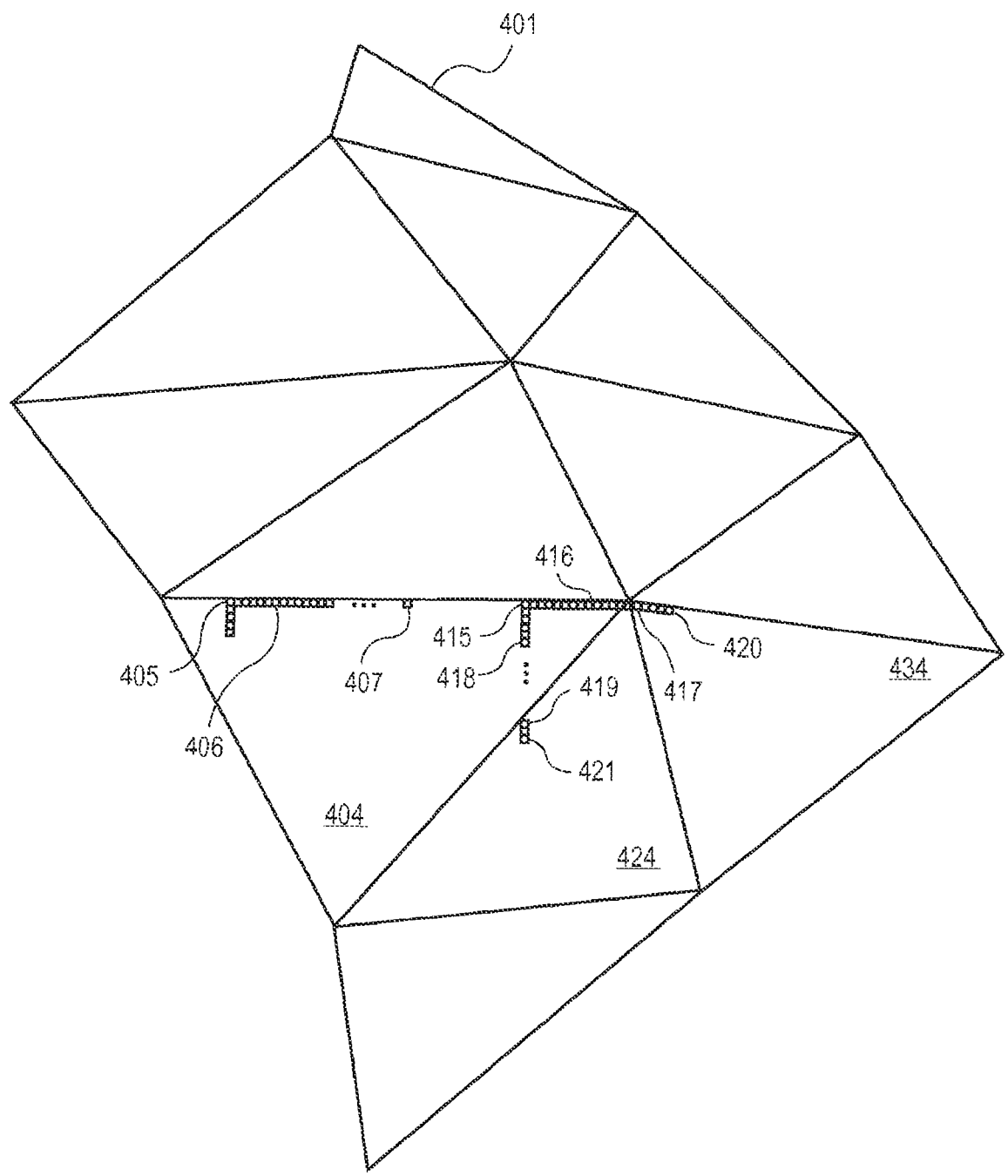
FIG. 4 illustrates triangular facets on a 3D model being textured in accordance with an embodiment.

FIG. 4 illustrates triangular facets on a 3D model being textured in accordance with an embodiment. Pixels 405, 406, and 407 are aligned and on the same facet, facet 404. Thus, calculating a memory address of a texel mapped to pixel 407 has a relatively high probability of success if extrapolated from pixels 405 and 406. However, pixels associated with different, distinct facets can pose a different problem.

Pixels 415, 416, and 418 are also on facet 404. However, pixel 417 is on facet 434, a different facet than facet 414. Therefore, a slope-intercept extrapolation of pixels on the same facet may not work in this instance. In some cases, a new derivative using pixel 417 and 415, on different facets, may be better for slope-intercept extrapolation. For example, the memory address of the texel corresponding to pixel 420 can be estimated by taking a derivative between pixels 415 and 417.

In a perpendicular direction, the memory address of the texel corresponding to pixel 421 can be estimated by taking a derivative between pixels 415 and 419. Pixels 419 and 421 are on facet 424.

Higher-order derivatives can be calculated for curved surfaces or for extrapolation between different facets. Finite differences/quotients can be used. A higher-order derivative can be simply taking a difference between derivatives at a certain point and dividing by the distance between pixels at the point. For example, 2nd derivative can be calculated as:

$$\text{deriv}^2\_x = (\text{deriv}\_x_1 - \text{deriv}\_x_0)/(\text{sqrt}(\text{pixel}_{x_1,y_0}{}^2 - \text{pixel}_{x_0,y_0}{}^2)) \qquad \text{Eqn. 3:}$$

The 2nd derivative can be combined with the 1st derivative and coefficients to form a mathematically linear equation of the form $y = ax'' + bx' + x_0$, wherein $x''$ is a 2nd derivative, $x'$ is a 1st derivative, and a, b, and $x_0$ are constants. Even higher order derivatives, such as 3rd, 4th, etc. derivatives may be useful in certain applications. Other estimation techniques can also be applied, such as those using exponential parameters, sine and cosine functions, Bessel functions, Laplace variables, and other orthogonal and nonorthogonal bases.

Figure 5:
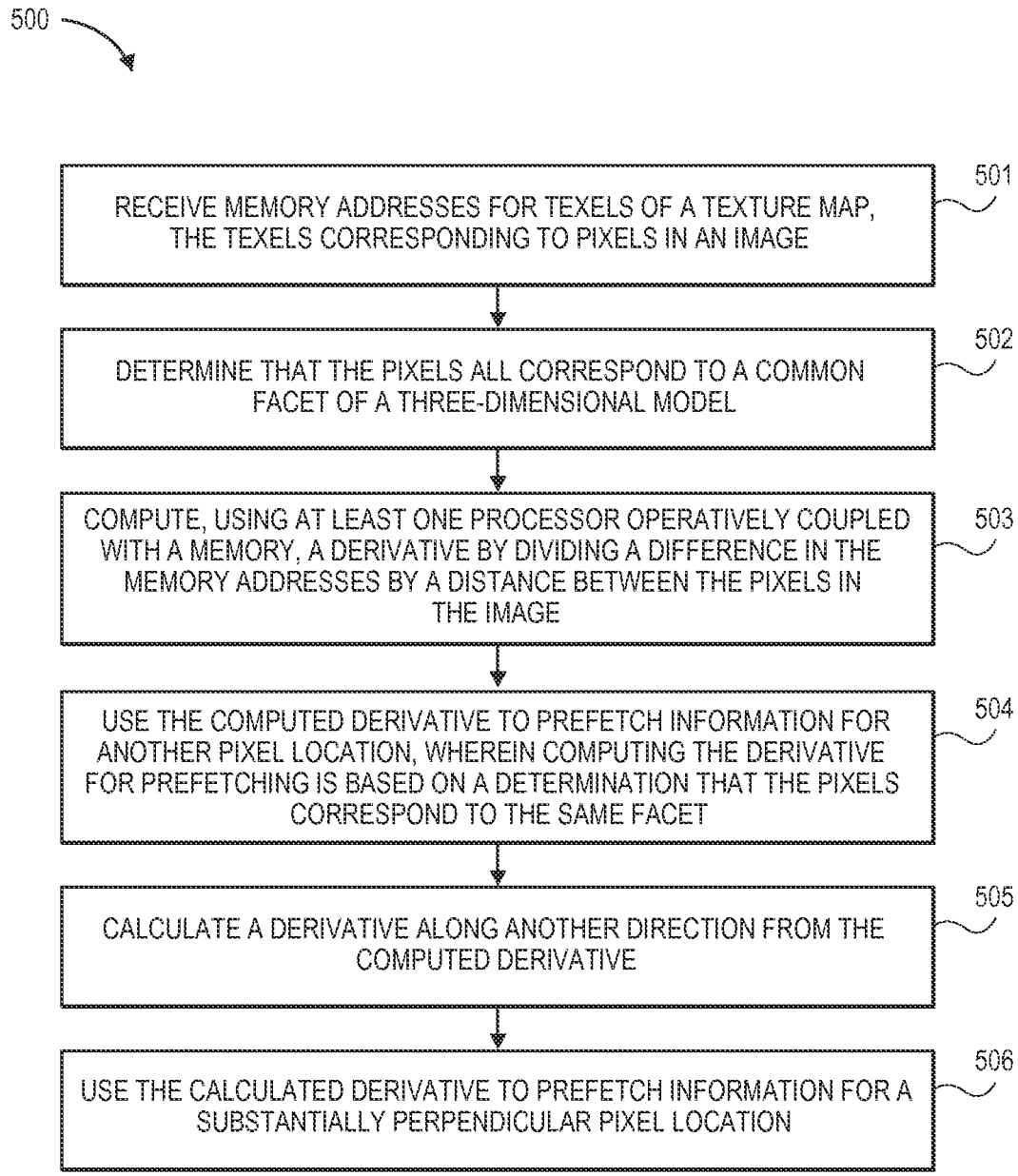
FIG. 5 is a flowchart of a process in accordance with an embodiment.

FIG. 5 is a flowchart illustrating process 500 in accordance with an embodiment. In operation 501, memory addresses for texels of a texture map are received, the texels corresponding to pixels in an image. In operation 502, it is determined that the pixels all correspond to a common facet of a three-dimensional model. In operation 503, a derivative is computed, using at least one processor operatively coupled with a memory, by dividing a difference in the memory addressees by a distance between the pixels in the image. In operation 504, the computed derivative is used to prefetch information for another pixel location. Computing the derivative for prefetching is based on a determination that the pixels correspond to the same facet. In operation 505, a derivative is calculated along another direction from the computed derivative. In operation 508, the calculated derivative is used to prefetch information for a substantially perpendicular pixel location.

Figure 6:
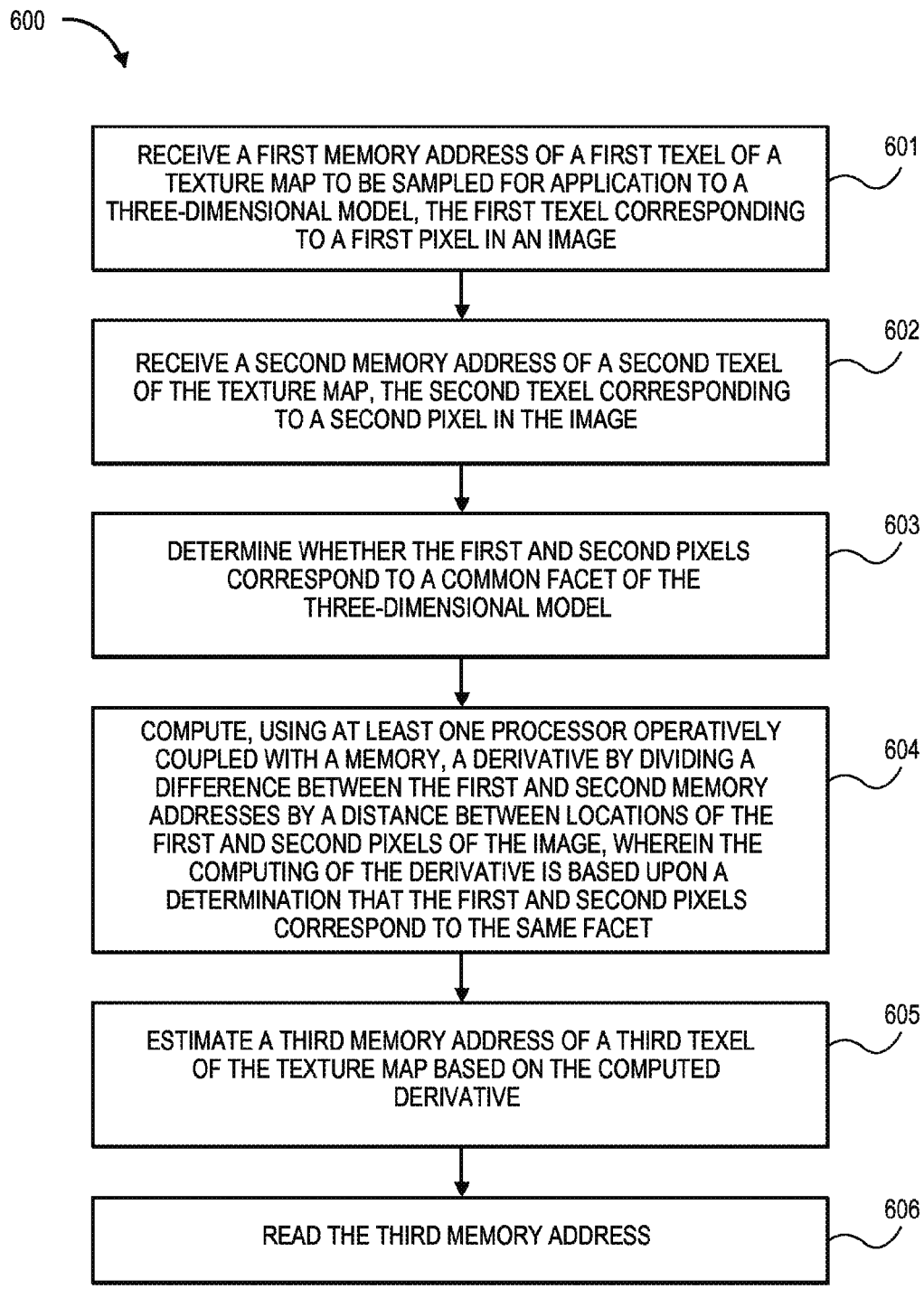
FIG. 6 is a flowchart of a process in accordance with an embodiment.

FIG. 6 is a flowchart illustrating process 600 in accordance with an embodiment. In operation 601, a first memory address of a first texel of a texture map to be sampled for application to a three-dimensional model is received, the first texel corresponding to a first pixel in an image. In operation 602, a second memory address of a second texel of the texture map is received, the second texel corresponding to a second pixel in the image. In operation 603, it is determined whether the first and second pixels correspond to a common facet of the three-dimensional model. In operation 604, a derivative is computed, using at least one processor operatively coupled with a memory, by dividing a difference between the first and second memory addresses by a distance between locations of the first and second pixels of the image. The computing of the derivative is based upon a determination that the first and second pixels correspond to the same facet. In operation 605, a third memory address of a third texel of the texture map is estimated based on the computed derivative. In operation 606, the third memory address is read.

The operations may be performed in the sequence given above or in different orders as applicable. They can be automated in a computer or other machine and can be coded in software, firmware, or hard coded as machine-readable instructions and run through one or more processors that can implement the instructions.

Figure 7:
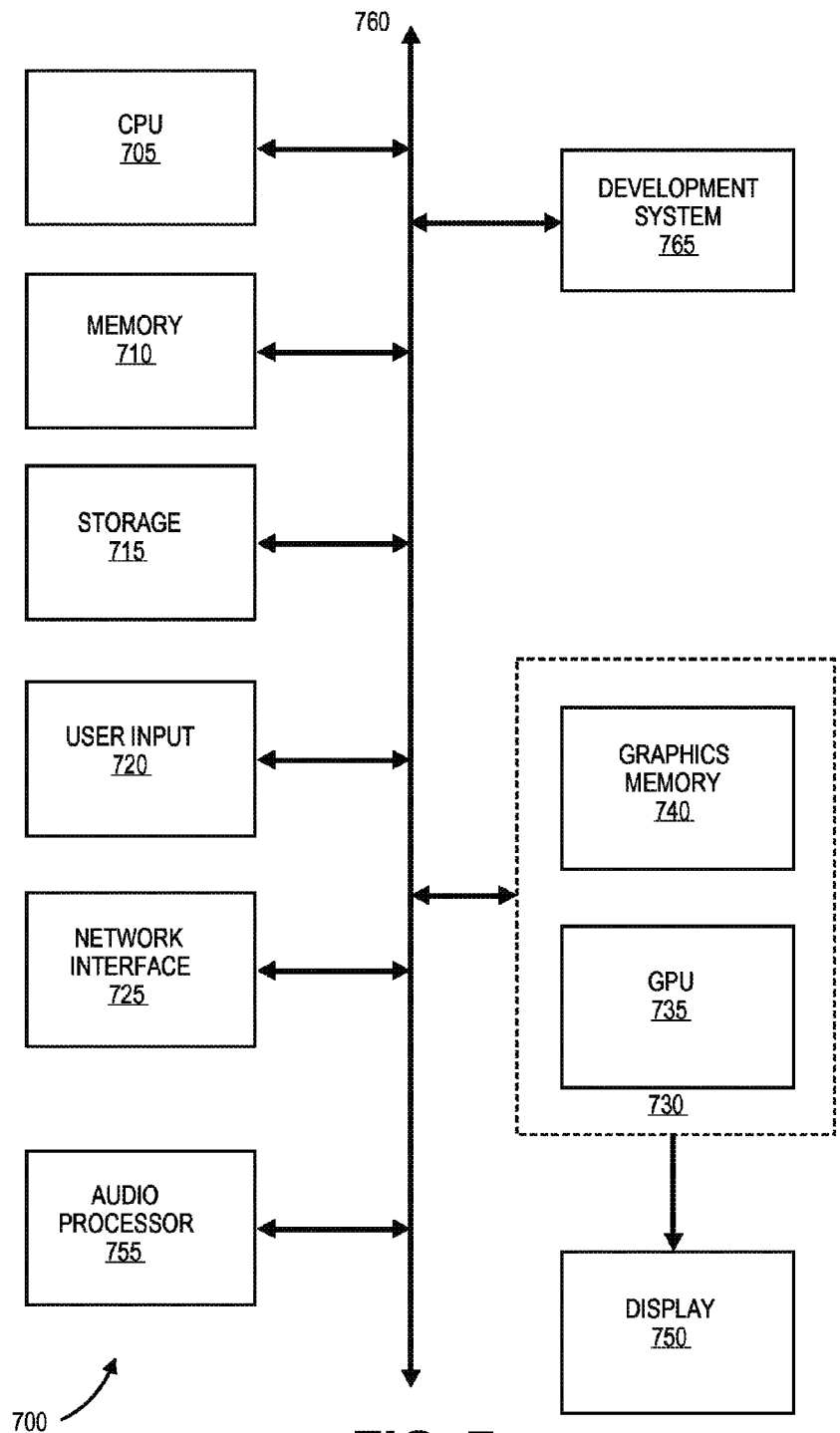
FIG. 7 illustrates a computer system suitable for implementing an embodiment.

FIG. 7 illustrates an example of a hardware system suitable for implementing a device in accordance with various embodiments. This block diagram illustrates a computer system 700, such as a personal computer, video game console and associated display, mobile device, personal digital assistant, or other digital device, suitable for practicing embodiments of the invention. Computer system 700 includes a central processing unit (CPU) 705 for running software applications and optionally an operating system. CPU 705 may be made up of one or more homogeneous or heterogeneous processing cores. Memory 710 stores applications and data for use by the CPU 705. Storage 715 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 720 communicate user inputs from one or more users to the computer system 700, examples of which may include keyboards, mice, joysticks, touch pads, touch screens, still or video cameras, and/or microphones. Network interface 725 allows computer system 700 to communicate with other computer systems via an electronic communications network, and may include wired or wireless communication over local area networks and wide area networks such as the Internet. An audio processor 730 is adapted to generate analog or digital audio output from instructions and/or data provided by the CPU 705, memory 710, and/or storage 715. The components of computer system 700, including CPU 705, memory 710, data storage 715, user input devices 720, network interface 725, and audio processor 730 are connected via one or more data buses 735.

A graphics subsystem 740 is further connected with data bus 735 and the components of the computer system 700. The graphics subsystem 740 includes a graphics processing unit (GPU) 745 and graphics memory 750. Graphics memory 750 includes a display memory (e.g., a frame buffer) used for storing pixel data for each pixel of an output image. Graphics memory 750 can be integrated in the same device as GPU 745, connected as a separate device with GPU 745, and/or implemented within memory 710. Pixel data can be provided to graphics memory 750 directly from the CPU 705. Alternatively, CPU 705 provides the GPU 745 with data and/or instructions defining the desired output images, from which the GPU 745 generates the pixel data of one or more output images. The data and/or instructions defining the desired output images can be stored in memory 710 and/or graphics memory 750. In an embodiment, the GPU 745 includes 3D rendering capabilities for generating pixel data for output images from instructions and data defining the geometry, lighting, shading, texturing, motion, and/or camera parameters for a scene. The GPU 745 can further include one or more programmable execution units capable of executing shader programs.

The graphics subsystem 740 periodically outputs pixel data for an image from graphics memory 750 to be displayed on display device 755. Display device 755 can be any device capable of displaying visual information in response to a signal from the computer system 700, including CRT, LCD, plasma, and OLED displays. Computer system 700 can provide the display device 755 with an analog or digital signal.

In accordance with various embodiments, CPU 705 is one or more general-purpose microprocessors having one or more processing cores. Further embodiments can be implemented using one or more CPUs 705 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of preparing to prefetch a texel for graphics processing, the method comprising:
    receiving memory addresses for texels of a texture map, the texels corresponding to a set of pixels in an image;
    determining that the set of pixels correspond to a common non-linear surface on different facets of a three-dimensional model;
    computing, using at least one processor operatively coupled with a memory, a surface derivative of a change in a texel memory location to a change in a surface location based at least in part on curve parameters of the non-linear surface;
    determining, based at least in part on the computed surface derivative, a predicted memory location of a texel in the texture map that corresponds to a selected pixel on the surface; and
    prefetching a texel for the selected pixel using the predicted memory location,
    wherein computing the surface derivative for prefetching is based on a determination that the pixels correspond to the same non-linear surface on different facets.

2. The method of claim 1 further comprising:
    calculating a derivative along another direction from the computed surface derivative; and
    using the calculated surface derivative to prefetch texel information for a substantially perpendicular pixel location.

3. The method of claim 1, wherein the non-linear surface includes a curved surface.

4. The method of claim 1, wherein the surface derivative includes a higher order polynomial.

5. A method for preparing to prefetch a texel for graphics processing, the method comprising:
    receiving a first memory address of a first texel of a texture map to be sampled for application to a three-dimensional model, the first texel corresponding to a first pixel in an image;
    receiving a second memory address of a second texel of the texture map, the second texel corresponding to a second pixel in the image;
    determining whether the first and second pixels correspond to a common non-linear surface on different facets of the three-dimensional model;
    computing, using at least one processor operatively coupled with a memory, a surface derivative of a change in a texel memory location to a change in a surface location based at least in part on curve parameters of the non-linear geometry;
    determining a third memory address of a third texel of the texture map corresponding to a third pixel based on the computed surface derivative; and
    fetching the third texel for the third pixel using the determined memory location, wherein the computing of the derivative is based upon a determination that the first and second pixels correspond to the same non-linear surface on different facets.

6. The method of claim 5 further comprising:
determining whether a third pixel in the image corresponds to the same non-linear surface to which the first and second pixels correspond,
wherein the determining of the third memory address is based upon a determination that the third pixel corresponds to the same non-linear surface to which the first and second pixels correspond.

7. The method of claim 5 further comprising:
receiving at least one additional memory address of at least one additional texel of the texture map to be sampled for application to the three-dimensional model, the at least one additional texel corresponding to at least one additional pixel of the image;
computing a higher-order derivative by dividing a difference of lower-order derivatives by a distance between locations of the first or second pixel and the at least one additional pixel of the image; and
predicting a memory address of a texel of the texture map based on the computed higher-order derivative.

8. The method of claim 7 further comprising:
determining whether the at least one additional pixel corresponds to a different facet than the facet to which the first or the second pixel corresponds,
wherein the predicting the memory address is based upon a determination that the at least one additional pixel corresponds to a different facet than the facet to which the first or the second pixel corresponds.

9. The method of claim 5 further comprising:
receiving a fourth memory address of a fourth texel of the texture map, the fourth texel corresponding to a fourth pixel in the image;
calculating a derivative by dividing a difference between the first and fourth memory addresses by a distance between locations of the first and fourth pixels of the image; and
determining a fifth memory address of a fifth texel of the texture map based on the calculated derivative,
wherein directions between the first and second texel and between the first and fourth texel are orthogonal with respect to each other.

10. The method of claim 5 further comprising:
reading the third memory address; and
applying the third texel to a third pixel in the image.

11. The method of claim 5 wherein pixels are along an axis.

12. The method of claim 5 wherein facets of the three-dimensional model are selected from the group consisting of lines, triangles, quadrilaterals, hexagonal elements, sprites, and point sprites.

13. The method of claim 5 wherein the three-dimensional model is for a video game or computer aided drafting (CAD).

14. The method of claim 5 wherein the operations are performed by a graphics processing unit (GPU).

15. The method of claim 5 wherein the operations are performed in the order shown.

16. The method of claim 5 wherein each operation is performed by the at least one processor operatively coupled with the memory.

17. A machine-readable non-transitory tangible storage medium embodying information indicative of instructions for causing one or more machines to perform the operations of claim 5.

18. A computer system executing instructions in a computer program, the computer program instructions comprising program code for performing the operations of claim 5.

* * * * *